United States Patent
Takada

(10) Patent No.: US 11,008,931 B2
(45) Date of Patent: May 18, 2021

(54) PRE-CHAMBER TYPE INTERNAL COMBUSTION ENGINE

(71) Applicant: TOYOTA JIDOSHA KABUSHIKI KAISHA, Toyota (JP)

(72) Inventor: Noriyuki Takada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/578,606

(22) Filed: Sep. 23, 2019

(65) Prior Publication Data

US 2020/0165960 A1    May 28, 2020

(30) Foreign Application Priority Data

Nov. 22, 2018   (JP) .............................. JP2018-219531

(51) Int. Cl.
| F02B 19/12 | (2006.01) |
| H01T 13/54 | (2006.01) |
| F02B 19/18 | (2006.01) |

(52) U.S. Cl.
CPC .............. *F02B 19/12* (2013.01); *F02B 19/18* (2013.01); *H01T 13/54* (2013.01)

(58) Field of Classification Search
CPC .......... F02B 19/12; F02B 19/18; H01T 13/54; Y02T 10/12
See application file for complete search history.

(56) References Cited

U.S. PATENT DOCUMENTS

| 8,912,716 | B2 * | 12/2014 | Hwang | ................... H01T 13/54 |
| | | | | 313/143 |
| 2006/0144362 | A1 * | 7/2006 | Robinet | .................. F02B 19/12 |
| | | | | 123/270 |

FOREIGN PATENT DOCUMENTS

| JP | 2007-138909 A | 6/2007 |
| JP | 2012-047115 A | 3/2012 |
| JP | 2012-047144 A | 3/2012 |

* cited by examiner

*Primary Examiner* — Gonzalo Laguarda
(74) *Attorney, Agent, or Firm* — Oblon, McClelland, Maier & Neustadt, L.L.P.

(57) ABSTRACT

A cylinder head is formed with a pre-chamber surrounded by a thin pre-chamber wall sticking out from the inside wall surface of the cylinder head to the inside of the main combustion chamber. Inside of the pre-chamber, the electrode of a spark plug is arranged. When the spark plug is used to burn the air-fuel mixture in the pre-chamber, jet flames are ejected from the communication holes to the main combustion chamber. The thin pre-chamber wall is formed from a metal material while the overall outer circumferential surface around the communication holes passing through the thin pre-chamber wall is formed by a material with a lower heat conductivity than the thin pre-chamber wall.

1 Claim, 2 Drawing Sheets

PRE-CHAMBER TYPE INTERNAL COMBUSTION ENGINE

FIELD

The present invention relates to a pre-chamber type internal combustion engine.

BACKGROUND

Known in the art is a pre-chamber type internal combustion engine in which a main combustion chamber is formed between the inside wall surface of a cylinder head made of a metal and the top surface of a piston, a pre-chamber surrounded by a thin pre-chamber wall sticking out from the inside wall surface of the cylinder head to the inside of the main combustion chamber is formed at the cylinder head, communication holes communicating the inside of the pre-chamber and the inside of the main combustion chamber are formed inside the thin pre-chamber wall, the electrode of a spark plug is arranged in the pre-chamber, and, when the spark plug is used to make the air-fuel mixture in the pre-chamber burn, jet flames are ejected from the communication holes to the main combustion chamber, the thin pre-chamber wall is made a two-layer structure of the outside wall facing the main combustion chamber and the inside wall facing the pre-chamber, and the outside wall is formed by a material higher in heat conductivity than the inside wall (see for example Japanese Unexamined Patent Publication No. 2007-138909).

SUMMARY

Technical Problem

In this pre-chamber type internal combustion engine, at the time of engine high load, the front end of the thin pre-chamber wall exposed inside the main combustion chamber becomes excessively high in temperature, and the danger of the front end of the thin pre-chamber wall acting as a heat source resulting in self ignition of the air-fuel mixture in the main combustion chamber, that is, the danger of premature ignition of the air-fuel mixture in the main combustion chamber, has been focused on.

In this case, in this pre-chamber type internal combustion engine, in order to keep the air-fuel mixture in the main combustion chamber from prematurely igniting, it is necessary to enable the heat of the front end of the thin pre-chamber wall to escape to the cylinder head to lower the temperature of the front end of the thin pre-chamber wall. Based on this thinking, the thin pre-chamber wall is formed into a two-layer structure of the outside wall facing the main combustion chamber and the inside wall facing the pre-chamber and the outside wall is formed by a material higher in heat conductivity than the inside wall. If in this way the outside wall of the thin pre-chamber wall is formed by a material higher in heat conductivity than the inside wall, the heat of the front end of the thin pre-chamber wall exposed at the inside of the main combustion chamber is conducted through the outside wall with the high heat conductivity to the cylinder head, so the temperature of the front end of the thin pre-chamber wall exposed inside the main combustion chamber falls and, as a result, the air-fuel mixture in the main combustion chamber is kept from prematurely igniting.

However, premature ignition of the air-fuel mixture in a pre-chamber type internal combustion engine occurs due to the fact that in the combustion chamber as a whole including the main combustion chamber and the pre-chamber, the location becoming the highest in temperature becomes a heat source. In this case, in a pre-chamber type internal combustion engine with the electrode of a spark plug arranged in the pre-chamber, in the combustion chamber as a whole including the main combustion chamber and the pre-chamber, the electrode of the spark plug in the pre-chamber becomes highest in temperature. Therefore, premature ignition of the air-fuel mixture most easily occurs in the pre-chamber around the electrode of the spark plug. In this case, to keep premature ignition of the air-fuel mixture in the pre-chamber from occurring, a gas temperature inside the pre-chamber has to be lowered, and to do so, it is necessary to escape the heat of the inside wall of the thin pre-chamber wall to the outside. However, in the above-mentioned pre-chamber type internal combustion engine, the inside wall of the thin pre-chamber wall is formed by a material with a lower heat conductivity than the outside wall, so it is difficult to cause heat to escape from the inside wall of the thin pre-chamber wall and as a result there is the problem of premature ignition of the air-fuel mixture in the pre-chamber.

To solve the above problem, according to the present invention, there is provided a pre-chamber type internal combustion engine comprising;
a main combustion chamber formed between an inside wall surface of a metal cylinder head and a top surface of a piston,
a pre-chamber formed at the cylinder head and surrounded by a thin pre-chamber wall sticking out from the inside wall surface of the cylinder head to the inside of the main combustion chamber, said thin pre-chamber wall having communication holes formed therein and communicating an inside of the pre-chamber and an inside of the main combustion chamber, and
a spark plug having an electrode arranged in the pre-chamber, jet flames being ejected from the communication holes to the main combustion chamber when an air-fuel mixture in the pre-chamber is burned by the spark plug, wherein
the thin pre-chamber wall is formed from a metal material and an entire outer circumferential surface around the communication holes passing through the thin pre-chamber wall is formed by a material with a lower heat conductivity than the thin pre-chamber wall.

Advantageous Effects of Invention

By forming the entire outer circumferential surface around the communication holes passing through the thin pre-chamber wall by a material with a lower heat conductivity than the thin pre-chamber wall, it is possible to secure powerful jet flames from the communication holes while suppressing premature ignition of the air-fuel mixture in the pre-chamber.

DESCRIPTION OF EMBODIMENTS

Figure 1:
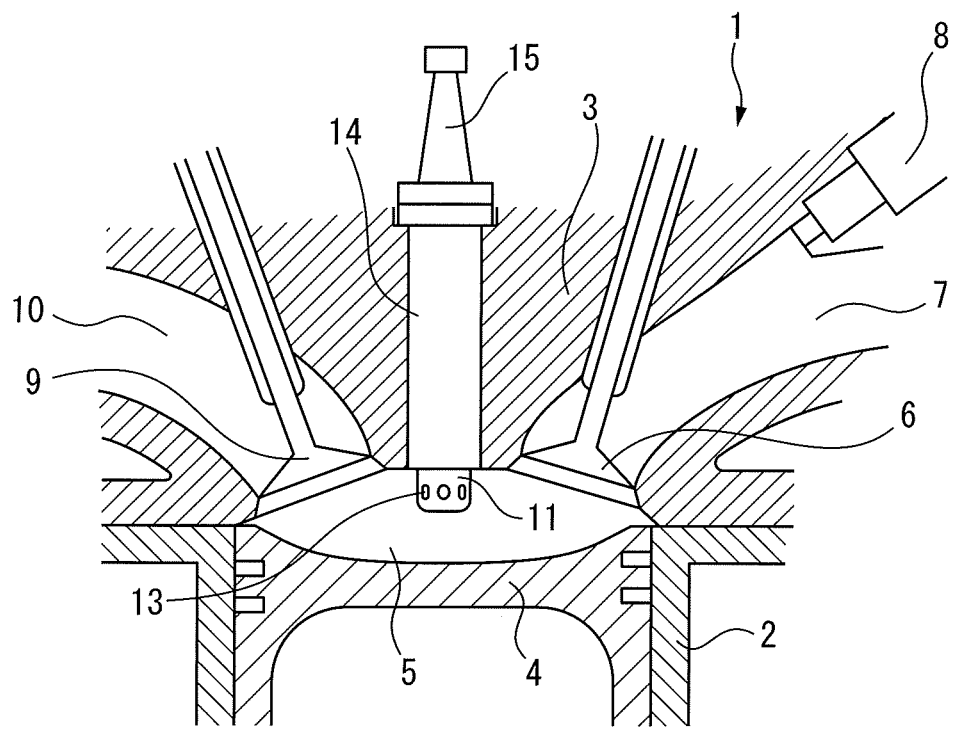
FIG. 1 is a side view of a pre-chamber type internal combustion engine.

FIG. 1 shows an overall view of a pre-chamber type internal combustion engine using gasoline as fuel. If referring to FIG. 1, 1 indicates an engine body, 2 a cylinder block, 3 a cylinder head made of a metal and attached on the cylinder block 2, 4 a piston reciprocating inside the cylinder block 2, 5 a main combustion chamber formed between the inside wall surface of the cylinder head 3 made of a metal and the top surface of the piston 4, 6 an intake valve, 7 an intake port, 8 a fuel injector arranged inside the intake port 7, 9 an exhaust valve, and 10 an exhaust port.

Figure 2:
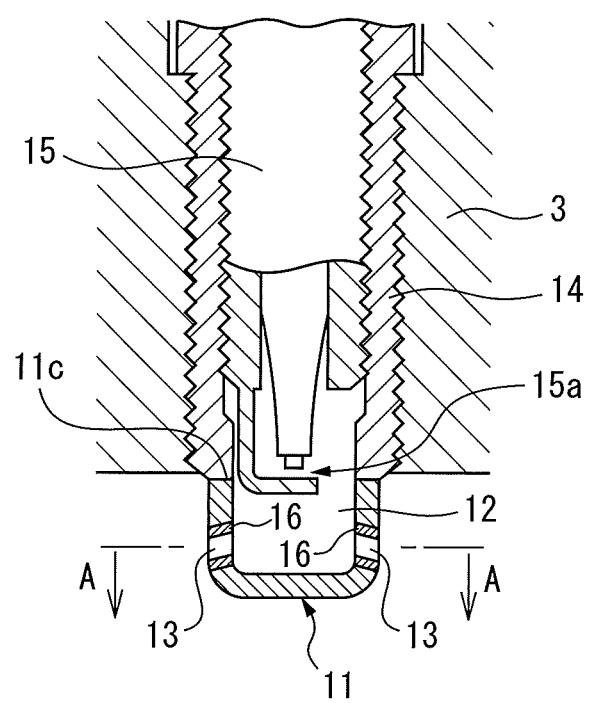
FIG. 2 is an enlarged side cross-sectional view of the surroundings of a pre-chamber.
Figure 3:
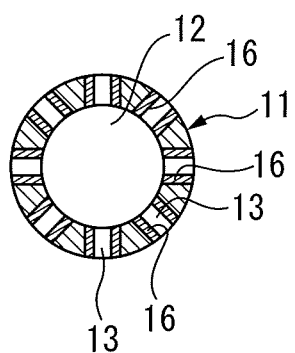
FIG. 3 is a cross-sectional view seen along the A-A section of FIG. 2.

As shown in FIG. 1 and FIG. 2, the cylinder head 3 is formed with a pre-chamber 12 surrounded by a thin pre-chamber wall 11 sticking out from the inside wall surface of the cylinder head 3 to the inside of the main combustion chamber 5. This thin pre-chamber wall 11 is, for example, formed by a metal material with a high heat conductivity like stainless steel. Inside the thin pre-chamber wall 11, a plurality of communication holes 13 are formed communicating the inside of the pre-chamber 12 and the inside of the main combustion chamber 5. In the embodiment shown in FIG. 1 and FIG. 2, as shown in FIG. 3, these communication holes 13 extend radially from the inside of the pre-chamber 12 toward the inside of the main combustion chamber 5.

As shown in FIG. 2, inside the cylinder head 3, a metal hollow sleeve 14 is screwed. Inside this hollow sleeve 14, the body of the spark plug 15 is screwed. In this case, in the embodiment shown in FIG. 2, the body of the spark plug 15 is screwed into the hollow sleeve 14 so that the discharge gap 15a of the spark plug 15 is positioned at substantially the same height position as the ring-shaped end face 11c of the thin pre-chamber wall 11. The pre-chamber 12 is formed between the front end of the spark plug 15 inserted into the hollow sleeve 14 and the inside surface of the thin pre-chamber wall 11. Note that, in the embodiment shown in FIG. 2, the ring-shaped end face 11c of the thin pre-chamber wall 11 is connected to the front end face of the hollow sleeve 14 by welding.

In the pre-chamber type internal combustion engine shown in FIG. 1, when the intake valve 6 opens, the fuel injected from the fuel injector 8 is supplied together with the intake air to the inside of the main combustion chamber 5. Due to this, an air-fuel mixture is formed inside the main combustion chamber 5. Next, when the compression stroke is started, the air-fuel mixture inside the main combustion chamber 5 flows in from the communication holes 13 to the pre-chamber 12. Next, when reaching the end period of the compression stroke, the spark plug 15 ignites the air-fuel mixture in the pre-chamber 12, whereby jet flames are ejected from the communication holes 13 of the pre-chamber 12 toward the inside of the main combustion chamber 5. The air-fuel mixture inside the main combustion chamber 5 is made to rapidly burn by these jet flames.

Further, when the compression stroke is started and the air-fuel mixture inside the main combustion chamber 5 flows from the communication holes 13 to the inside of the pre-chamber 12, this air-fuel mixture is heated by the high temperature inside surface of the thin pre-chamber wall 11. As a result, the gas temperature inside the pre-chamber 12 becomes higher. On the other hand, in a pre-chamber type internal combustion engine where the electrode of the spark plug 15 is arranged in the pre-chamber 12, in the combustion chamber as a whole including both the main combustion chamber 5 and the pre-chamber 12, the electrode of the spark plug 15 inside the pre-chamber 12 becomes highest in temperature. Therefore, inside the pre-chamber 12 around the electrode of the spark plug 15, premature ignition of the air-fuel mixture most easily occurs.

However, in the embodiment according to the present invention, the thin pre-chamber wall 11 is formed by a metal material with a high heat conductivity. Therefore, the heat of the gas inside the pre-chamber 12 passes through the thin pre-chamber wall 11, is allowed to escape to the hollow sleeve 14, then is allowed to escape to the cylinder head 3. As a result, the gas temperature inside the sub chamber 12 is kept low. Therefore, even if the electrode of the spark plug 15 becomes higher in temperature, premature ignition of the air-fuel mixture inside the pre-chamber 12 is suppressed.

On the other hand, if forming the thin pre-chamber wall 11 as a whole by a metal material with a high heat conductivity, the jet flames ejected from the pre-chamber 12 are robbed of heat at the circumferential wall surfaces of the communication holes 13 when flowing through the insides of the communication holes 13. As a result, the ejection force of the jet flames falls. If the ejection force of the jet flames falls, the disturbance inside the main combustion chamber 5 caused by the jet flames is weakened and the distance reached by the jet flames becomes shorter, so good combustion inside the main combustion chamber 5 can no longer be secured.

Therefore, in the embodiment according to the present invention, as shown in FIG. 2 and FIG. 3 by 16, the entire outer circumferential surface around the communication holes 13 passing through the thin pre-chamber wall 11 is formed by a material with a lower heat conductivity than the thin pre-chamber wall 11. In this case, in the embodiment shown in FIG. 2 and FIG. 3, the entire outer circumferential surface around the communication holes 13 is coated or flame sprayed with a material with a lower heat conductivity than the thin pre-chamber wall 11 whereby a coating layer 16 with a heat conductivity lower than the thin pre-chamber wall 11 is formed on the entire outer circumferential surface around the communication holes 13.

If in this way the entire outer circumferential surface around the communication holes 13 passing through the thin pre-chamber wall 11 is formed by a material with a lower heat conductivity than the thin pre-chamber wall 11, the jet flames ejected from the pre-chamber 12 are not cooled much at all by the circumferential wall surfaces of the communication holes 13 when flowing through the communication holes 13. As a result, powerful jet flames are obtained. As a result, jet flames cause a powerful disturbance to be generated inside the main combustion chamber 5 and the distance reached by the jet flames becomes longer, so good combustion is secured in the main combustion chamber 5. Therefore, in the embodiment according to the present invention, it is possible to secure powerful jet flames from the communication holes 13 while suppressing premature ignition of the air-fuel mixture inside the pre-chamber 12.

Figure 4:
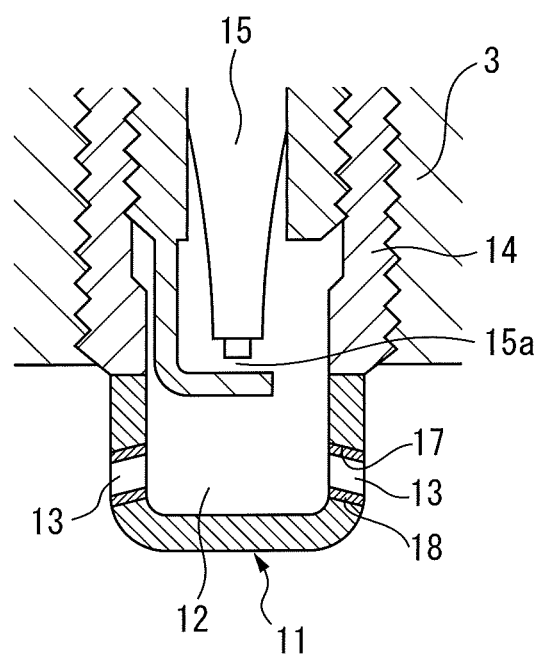
FIG. 4 is an enlarged side cross-sectional view of the surroundings of a pre-chamber showing another embodiment.

FIG. 4 shows another embodiment. In this embodiment, the thin pre-chamber wall 11 is formed with through holes 17 of diameters larger than the communication holes 13 shown in FIG. 2 and FIG. 3. Inside the through holes 17, hollow tubes 18 formed by a material with a lower heat conductivity than the thin pre-chamber wall 11 are inserted. These hollow tubes 18 are, for example, formed from ceramic tubes and, for example, are fastened to the insides of the through holes 17 using an adhesive, and the communication holes 13 are formed inside these hollow tubes 16.

In this embodiment as well, the jet flames ejected from the pre-chamber 12 are not cooled much at all by the circumferential wall surfaces of the communication holes 13 when flowing through the communication holes 13. As a result, powerful jet flames are obtained. Therefore, it is possible to secure powerful jet flames from the communication holes 13 while suppressing premature ignition of the air-fuel mixture inside the pre-chamber 12.

The invention claimed is:

1. A pre-chamber type internal combustion engine comprising;
   - a main combustion chamber formed between an inside wall surface of a metal cylinder head and a top surface of a piston,
   - a pre-chamber formed at the cylinder head and surrounded by a pre-chamber wall sticking out from the inside wall surface of the cylinder head to the inside of the main combustion chamber, said pre-chamber wall including communication holes formed therein and communicating an inside of the pre-chamber and an inside of the main combustion chamber, and
   - a spark plug including an electrode arranged in the pre-chamber, jet flames being ejected from the communication holes to the main combustion chamber when an air-fuel mixture in the pre-chamber is burned by the spark plug, wherein
   said pre-chamber wall is formed from a metal material and only an entire outer circumferential surface around the communication holes passing through the pre-chamber wall is formed by a material with a lower heat conductivity than a remainder of the pre-chamber wall, and
   the remainder of the pre-chamber wall is made of stainless steel and the material with the lower heat conductivity is a coating layer.

* * * * *